(12) United States Patent
Ollgaard et al.

(10) Patent No.: US 8,878,377 B2
(45) Date of Patent: Nov. 4, 2014

(54) WIND TURBINE, A METHOD FOR REDUCING NOISE EMISSION FROM A WIND TURBINE TOWER AND USE OF A WIND TURBINE

(75) Inventors: Borge Ollgaard, Esbjerg (DK); Erik Billeskov Sloth, Aalborg O (DK)

(73) Assignee: Vestas Wind Systems A/S, Aarhus N. (DK)

( * ) Notice: Subject to any disclaimer, the term of this patent is extended or adjusted under 35 U.S.C. 154(b) by 703 days.

(21) Appl. No.: 12/808,929

(22) PCT Filed: Dec. 16, 2008

(86) PCT No.: PCT/DK2008/000435
§ 371 (c)(1),
(2), (4) Date: Jun. 17, 2010

(87) PCT Pub. No.: WO2009/080028
PCT Pub. Date: Jul. 2, 2009

(65) Prior Publication Data
US 2010/0314884 A1    Dec. 16, 2010

Related U.S. Application Data

(60) Provisional application No. 61/015,836, filed on Dec. 21, 2007.

(30) Foreign Application Priority Data

Dec. 21, 2007   (DK) .................................. 2007 01857

(51) Int. Cl.
*F03D 9/00* (2006.01)
*H02P 9/04* (2006.01)
*F03D 11/04* (2006.01)

(52) U.S. Cl.
CPC ............. *F03D 11/04* (2013.01); *F05B 2260/96* (2013.01); *Y02E 10/726* (2013.01); *Y02E 10/728* (2013.01)
USPC .............................................. 290/44; 290/55

(58) Field of Classification Search
USPC ...................................................... 290/44, 55
See application file for complete search history.

(56) References Cited

U.S. PATENT DOCUMENTS 3,574,358 A * 4/1971 Cassel ............................ 285/53
4,373,608 A * 2/1983 Holmes ........................ 181/202
(Continued)

FOREIGN PATENT DOCUMENTS

DE          10222646 A1    1/2004
DE          10309825 A1    9/2004
(Continued)

OTHER PUBLICATIONS

Denmark Patent and Trademark Office; Danish Search Report issued in related Danish Patent Application No. PA 2007 01857; Jul. 31, 2008; 5 pages.

(Continued)

*Primary Examiner* — Pedro J Cuevas
(74) *Attorney, Agent, or Firm* — Wood, Herron & Evans, LLP

(57) ABSTRACT

The invention relates to a wind turbine having a wind turbine tower having a tower wall, a wind turbine nacelle positioned on top of the tower and noise reducer for reducing noise emission from the tower. The noise reducer including a beam formed as an elongated strengthening member and one or more dampers, where the dampers are arranged between the tower wall and the beam, the dampers being arranged so that relative movement between the tower wall and the beam results in dissipation of energy via the dampers in order to reduce noise emission. The invention further relates to a method for reducing noise emission from a wind turbine tower.

20 Claims, 8 Drawing Sheets

(56) References Cited

U.S. PATENT DOCUMENTS

Figure 1:
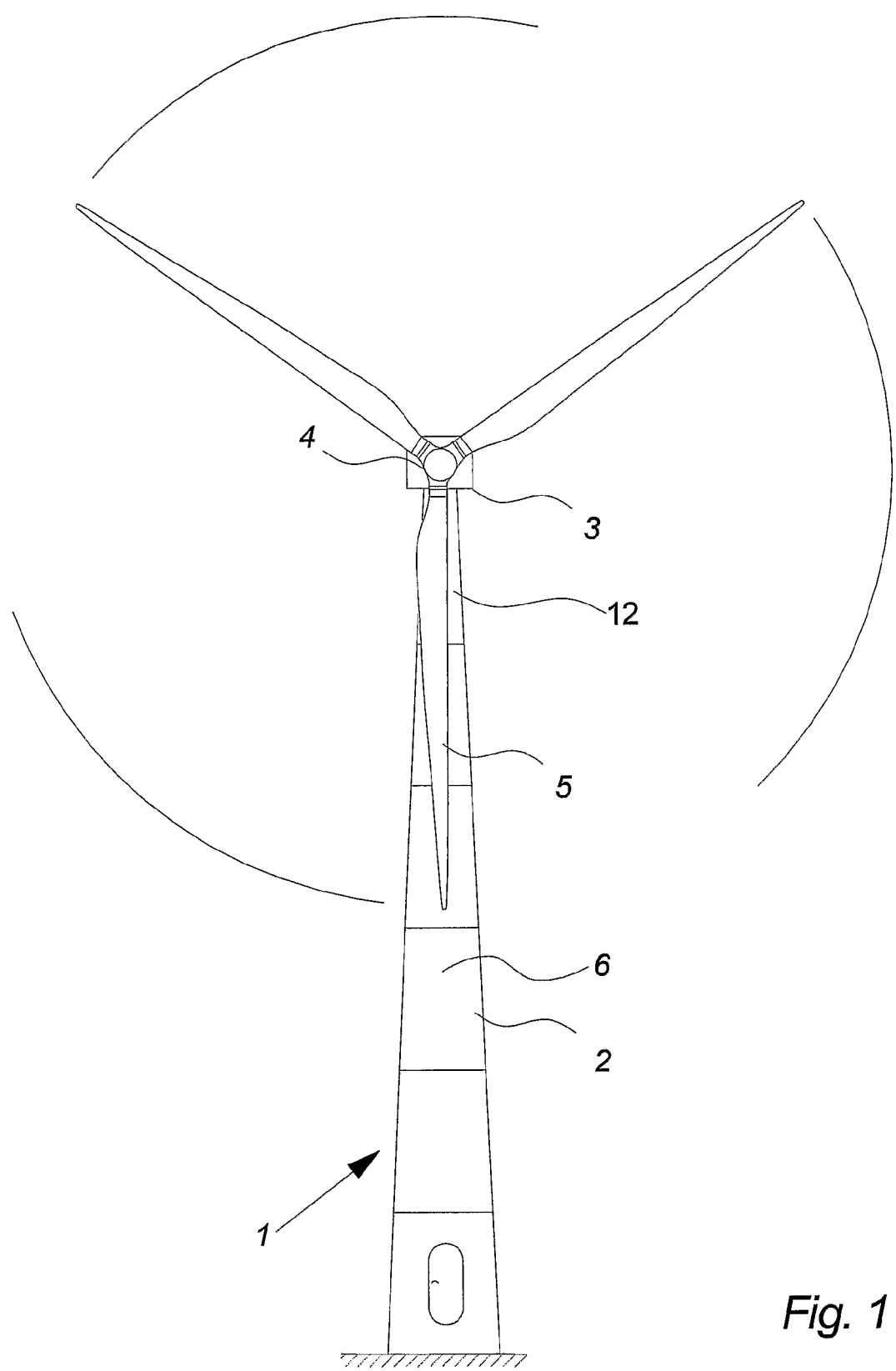

| | | | | |
|---|---|---|---|---|
| 4,962,826 | A * | 10/1990 | House | 181/207 |
| 5,518,347 | A * | 5/1996 | Cobb, Jr. | 409/141 |
| 5,700,116 | A * | 12/1997 | Cobb, Jr. | 409/141 |
| 6,155,378 | A * | 12/2000 | Qatu et al. | 181/255 |
| 6,213,721 | B1 | 4/2001 | Watkinson | 416/244 A |
| 6,241,062 | B1 * | 6/2001 | Enright | 188/378 |
| 6,672,837 | B1 * | 1/2004 | Veldkamp et al. | 416/144 |
| 6,713,891 | B2 * | 3/2004 | Kirkegaard et al. | 290/44 |
| 7,072,144 | B2 * | 7/2006 | Arya | 360/234.6 |
| 7,144,216 | B2 * | 12/2006 | Hessel | 415/119 |
| 7,352,537 | B2 * | 4/2008 | Dominguez et al. | 360/265.7 |
| 7,445,685 | B2 * | 11/2008 | Deakin et al. | 156/212 |
| 7,637,721 | B2 * | 12/2009 | Driver et al. | 416/224 |
| 7,735,289 | B2 * | 6/2010 | Ollgaard | 52/633 |
| 7,811,063 | B2 * | 10/2010 | Bonnet | 416/229 R |
| 7,928,593 | B2 * | 4/2011 | Ollgaard | 290/44 |
| 8,007,244 | B2 * | 8/2011 | Deakin et al. | 416/229 A |
| 8,567,131 | B2 * | 10/2013 | Ollgaard | 52/40 |
| 8,776,967 | B2 * | 7/2014 | Ollgaard | 188/379 |
| 2002/0059959 | A1 * | 5/2002 | Qatu et al. | 138/30 |
| 2003/0147753 | A1 * | 8/2003 | Ollgaard | 416/244 A |
| 2004/0244326 | A1 * | 12/2004 | Ollgaard | 52/633 |
| 2005/0166521 | A1 * | 8/2005 | Silber | 52/633 |
| 2006/0066111 | A1 * | 3/2006 | Suryanarayanan et al. | 290/44 |
| 2007/0114799 | A1 | 5/2007 | Riesberg et al. | 290/55 |
| 2008/0145232 | A1 * | 6/2008 | Ollgaard | 416/244 A |
| 2009/0016897 | A1 * | 1/2009 | Olgaard | 416/244 R |
| 2009/0142178 | A1 * | 6/2009 | Nieuwenhuizen | 415/2.1 |
| 2009/0200804 | A1 * | 8/2009 | Nielsen et al. | 290/44 |
| 2010/0074748 | A1 * | 3/2010 | Godsk et al. | 416/1 |
| 2010/0186342 | A1 * | 7/2010 | Ollgaard | 52/745.17 |
| 2010/0314883 | A1 * | 12/2010 | Ollgaard | 290/55 |
| 2010/0314884 | A1 * | 12/2010 | Ollgaard et al. | 290/55 |
| 2013/0297266 | A1 * | 11/2013 | Brincker | 703/1 |

FOREIGN PATENT DOCUMENTS

| | | |
|---|---|---|
| EP | 1515040 A1 | 3/2005 |
| EP | 1533521 A1 | 5/2005 |
| EP | 1783366 A1 | 5/2007 |
| WO | 99/63219 A1 | 12/1999 |
| WO | 2004/099609 A1 | 11/2004 |

OTHER PUBLICATIONS

European Patent Office, International Search Report and Written Opinion in related PCT Application Serial No. PCT/DK2008/000435, Feb. 9, 2010, 10 pgs.

* cited by examiner

WIND TURBINE, A METHOD FOR REDUCING NOISE EMISSION FROM A WIND TURBINE TOWER AND USE OF A WIND TURBINE

BACKGROUND OF THE INVENTION

The invention relates to a wind turbine, a method for reducing noise emission from a wind turbine tower and use of a wind turbine.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Particularly for land based wind turbines noise emission can be a serious problem, for example, in that the more noise the operating wind turbine generates the more remote it has to be sited.

Reduction of noise emission from wind turbines have therefore been a major focus area within the art of designing and constructing wind turbines in recent years.

Noise can be generated from many sources in and on the wind turbine and besides the interaction with the wind a major source can be vibration, for example, from gears meshing in the gearbox spreading as structure borne vibrations and ends up in generating vibrations in other parts of the wind turbine. Noise is then radiated from surfaces of these other parts as a function of the vibration level on the surface, and the noise radiation ability of the same surface. Any resonances in the structure will further amplify the vibration transmission.

Regarding this structural noise it is known that the wind turbine tower can be a problem and, for example, from the European patent application EP1 515 040 A1 it is therefore known to provide the outside of the wind turbine tower with a noise absorbing shell. However such a solution is complex, expensive and would mar the visual expression of the wind turbine.

From U.S. Pat. No. 6,213,721 it is also known to provide the surface of the wind turbine tower with noise emission reducing tiles comprising a heavy metal plate connected to the tower through a layer of plastic foam material glued to the tower. However, these tiles are complex and expensive and because this type of vibration damper works by adding mass to the tower walls, their relative high weight will strain the tower considerably.

An object of the invention is therefore to provide for an advantageous technique for reducing noise emission from a wind turbine tower.

SUMMARY OF THE INVENTION

The invention provides for a wind turbine comprising a wind turbine tower having a tower wall, a wind turbine nacelle positioned on top of the tower and noise reducing means for reducing noise emission from the tower. The noise reducing means comprises a beam formed as an elongated strengthening member and one or more damping means, where the damping means are arranged between the tower wall and the beam, the damping means being arranged so that relative movement between the tower wall and the beam results in dissipation of energy via the damping means in order to reduce noise emission.

For example, the tiles previously disclosed in U.S. Pat. No. 6,213,721 reduces noise emission by increasing the mass and thereby reducing the amplitudes of the noise inducing waves in the tower wall.

However, in wind turbine towers where weight is a big issue, it is advantageous to reduce noise emission by way of damping means arranged so that they are able to dissipate the energy of the noise inducing oscillations, in that this provides for a more efficient noise reduction at a much lower weight.

Placing the damping means between the tower wall and a rigid beam ensures that the oscillations in the tower wall will entail a deformation of the damping means, hence at least some of the energy is transformed to heat due to internal friction or hysteresis in the damping means and a damping and noise reducing effect is achieved.

It should be emphasized that by the term "beam" is to be understood any kind of girder, balk, joist, bar or pipe with any kind of open profile such as I, H, L, C or Z profile or any kind of closed profile such as square, rectangular, polygonal or round profile or any combination thereof.

In an aspect of the invention the noise is generated by oscillations forming waves in the tower wall and wherein the damping means are connected to the tower wall in positions arranged corresponding to at least two crests and one trough of said wave or to at least two troughs and one crest of said wave.

If the beam for, for example, only was connected to one trough and one crest of the wave, the beam would be displaced angularly substantially following the line between the two connection points, hence the damping means are only marginally deformed.

However, by arranging the damping means on a given beam so that they at some point in time interact with at least two crests and one trough or at least two troughs and one crest of a noise inducing oscillation in the tower wall—simultaneously, it is ensured that the damping means are deformed significantly by the oscillations, in that such a configuration would ensure that the beam would maintain its position during the oscillation of the tower wall or at least that the beam would only be displaced slightly linearly. This is advantageous in that the more the damping means are deformed by a given oscillation the more energy can be dissipated by the damping means; hence the noise reducing quality of the noise reducing means is increased.

In an aspect of the invention the noise reducing means are connected to a top section of said tower wall.

One of the main sources for structural borne vibrations in the wind turbine tower is gears meshing in the gearbox in the nacelle. If a gearbox is not present, another major source would be other mechanical vibration inducing equipment in the nacelle such as the generator, pumps for cooling or hydraulic systems, motors or other equipment. It is therefore advantageous that the noise reducing means be connected to the top section of the tower to eliminate the vibrations as early as possible before they spread down the tower and thereby increases the noise emission.

In an aspect of the invention the noise reducing means is connected to the inside of said tower.

The interior of the wind turbine tower presents a more controlled environment than the exterior and by placing the noise reducing means on the inside of the tower it is possible to better protect the noise reducing means from the fury of the elements.

In an aspect of the invention the damping means are formed as a flexible coupling between the tower wall and said beam.

For example, if the flexible coupling is a friction coupling or if the coupling material at least to some degree has a plastic behaviour, the oscillations in the tower wall will deform the damping means and thereby cause energy loss in the form of dissipation of kinetic energy, hence damping occurs.

Furthermore, the inside surface of a wind turbine tower can be slightly uneven and it is therefore advantageous to compensate for any permanent variation in the distance between the relatively rigid tower wall and the relatively rigid beam by using flexible couplings to make the noise reducing means adapt to the tower wall and thereby ensure good contact between all the damping means on a single beam and the tower wall.

In an aspect of the invention the damping means are at least partly made from rubber.

Synthetic and natural rubber is very inexpensive, it is flexible and at the same time able to convert at least some of the energy used to deform it to heat, making it advantageous for forming damping means capable of dissipating the energy of the tower wall oscillations.

In an aspect of the invention the one or more damping means comprise one or more magnets for connecting the noise reducing means to the tower wall by means of magnetic attraction forces of the magnets.

Connecting the noise reducing means to the tower wall by means of magnetic attraction forces is advantageous in that most modern wind turbine towers are made from steel and attachment by magnets is a simple and flexible solution, for example, enabling that the noise reducing means according to the present invention can be mounted in the tower without weakening the tower structure and in that the beams easily can be retrofitted.

In an aspect of the invention the noise reducing means comprise at least three damping means substantially evenly spaced along the longitudinal length of the beam.

If the beam was only connected in one point it would substantially only move back and forth in phase with the oscillations in the tower wall substantially without deforming the intermediate damping means.

If the beam was connected in two points the beam would be angularly displaced in phase with the positions of the oscillating wall at these points, hence the intermediate damping means would at best only be slightly deformed.

But if the beam is connected in three points, the chance of at least one of the points moving in a direction opposite the other two points is increased, hence the intermediate damping means are deformed more and more energy is dissipated.

Furthermore, by attaching the beams attached to the tower wall through in at least three displaced damping means is also advantageous in that the beams hereby braces and stiffens the tower walls thereby increasing the structural damping of the area of the tower where the beams are placed.

In an aspect of the invention the at least three damping means are mutually displaced by approximately half the wavelength of a noise inducing oscillation in the tower wall.

If the mutual distance between the damping means of a given beam is smaller or bigger than half the wavelength of a noise inducing oscillation in the tower wall the efficiency of the noise reducing means is reduced, in that the risk of the three or more damping means being affected in the same direction simultaneously is increased. It is therefore advantageous to place the damping means approximately half a wavelength apart along the length of the beam.

In an aspect of the invention the beam have a length, which is at least 1.5 times the wavelength of a noise inducing oscillations in the tower.

To increase the decay of vibrations spreading in the tower structure and thereby reduce the noise emission from the tower, it is more efficient if the rigid beam is so long that it is possible to connect it to the tower by means of at least one damping mean connected to a trough and at least two damping means connected to at least two different crests or at least two damping mean connected to at least two different troughs and at least one damping mean connected to at least one crest of the same wave spreading through the tower structure.

In an aspect of the invention, the one or more beams have a length of between 0.5 and 30 meters, preferably between 1 and 20 meters and most preferably between 2 and 8 meters.

If the beam is too long it becomes unnecessarily heavy and if it is too short it will not be able to reduce the noise emission efficiently. The present length ranges therefore provides for an advantageous relationship between weight and efficiency.

In an aspect of the invention the noise reducing means comprise tuning means for adjusting a centre distance between at least two of the damping means in accordance to a wavelength of the noise inducing oscillations in the tower wall.

Providing the noise reducing means according to the invention with tuning means is advantageous in that it is hereby enabled that the noise reducing means can be tuned to more efficiently reduce noise emission at a specific frequency, amplitude, wavelength or other.

Furthermore, adjusting the centre distance between the damping means of a single beam is advantageous in that it is a simple and efficient way of tuning the noise reducing means according to the present invention towards vibrations spreading at a specific wavelength.

In an aspect of the invention said beam is orientated substantially vertically on said tower.

When the beams are orientated substantially vertically, it is possible to make the noise reducing means straight and still make the beam follow the surface of the tower even though the tower or the specific tower section cones.

Furthermore, vertically mounted beams will cover a larger area vertically and thereby reduce the risk of structural borne vibrations spreading downwards towards the ground.

In an aspect of the invention the wind turbine comprise two or more noise reducing means substantially evenly spaced along a circumference of said tower.

More beams will increase the noise reducing effect of the beams and by spacing them evenly around the tower the noise is also evenly reduced around the tower.

In an aspect of the invention the beam is orientated substantially horizontally on the tower.

Noise inducing waves in the tower wall can under certain circumstances spread substantially horizontally along the circumference of the tower and it is therefore advantageous to orientate the beam substantially horizontally to enable interaction with several waves simultaneously. In such case the beam could e.g. be formed round to follow the circumference of the tower.

Furthermore the invention provides for a method for reducing noise emission from a wind turbine tower by providing a noise emitting tower wall with noise reducing means so that noise inducing oscillations in the tower wall result in dissipation of energy via damping means arranged between the tower wall and an elongate beam of the noise reducing means.

Hereby is provided a very efficient method for reducing noise emission from a wind turbine tower in that energy conversion by dissipation is a very light, inexpensive and efficient way of reducing noise emission.

In an aspect of the invention the method further comprises the step of establishing the wavelength of one or more of the noise inducing oscillations in the tower wall before the noise reducing means are provided to the noise emitting tower wall.

If the wavelength of one or more of noise inducing oscillations is known beforehand it is possible to make or adapt the noise reducing means to be more efficient at reducing waves at this wavelength. It would also enable that the noise reducing means could be selected from a number of different embodiments of noise reducing means to solve a specific tower noise problem.

In an aspect of the invention, the noise reducing means are tuned by adjusting the centre distance of the damping means in accordance with the wavelength of the noise inducing oscillations.

Hereby is achieved an advantageous embodiment of the invention.

In an aspect of the invention the noise reducing means are tuned by adjusting distances between the damping means connected to the same beam in accordance with the wavelength of the noise inducing oscillations.

Hereby is achieved an advantageous embodiment of the invention.

Even further, the invention provides for use of a wind turbine according to any of the above, wherein the wind turbine comprises a gearbox for increasing the rotational speed between the rotor and the generator of the wind turbine.

A gearbox and particularly a wind turbine gearbox—which typically comprises one or more epicyclical gear stages—includes a plurality of gears meshing during operation and the impact of the tooth meeting each other can create vibrations, which through the nacelle structure and through the yaw mechanism can spread to the tower wall, where the vibrations can make the tower wall emit noise. It is therefore particularly advantageous to use noise reducing means according to the present invention in relation with a wind turbine comprising a gearbox for increasing the rotational speed between the rotor and the generator.

FIGURES

Figure 2:
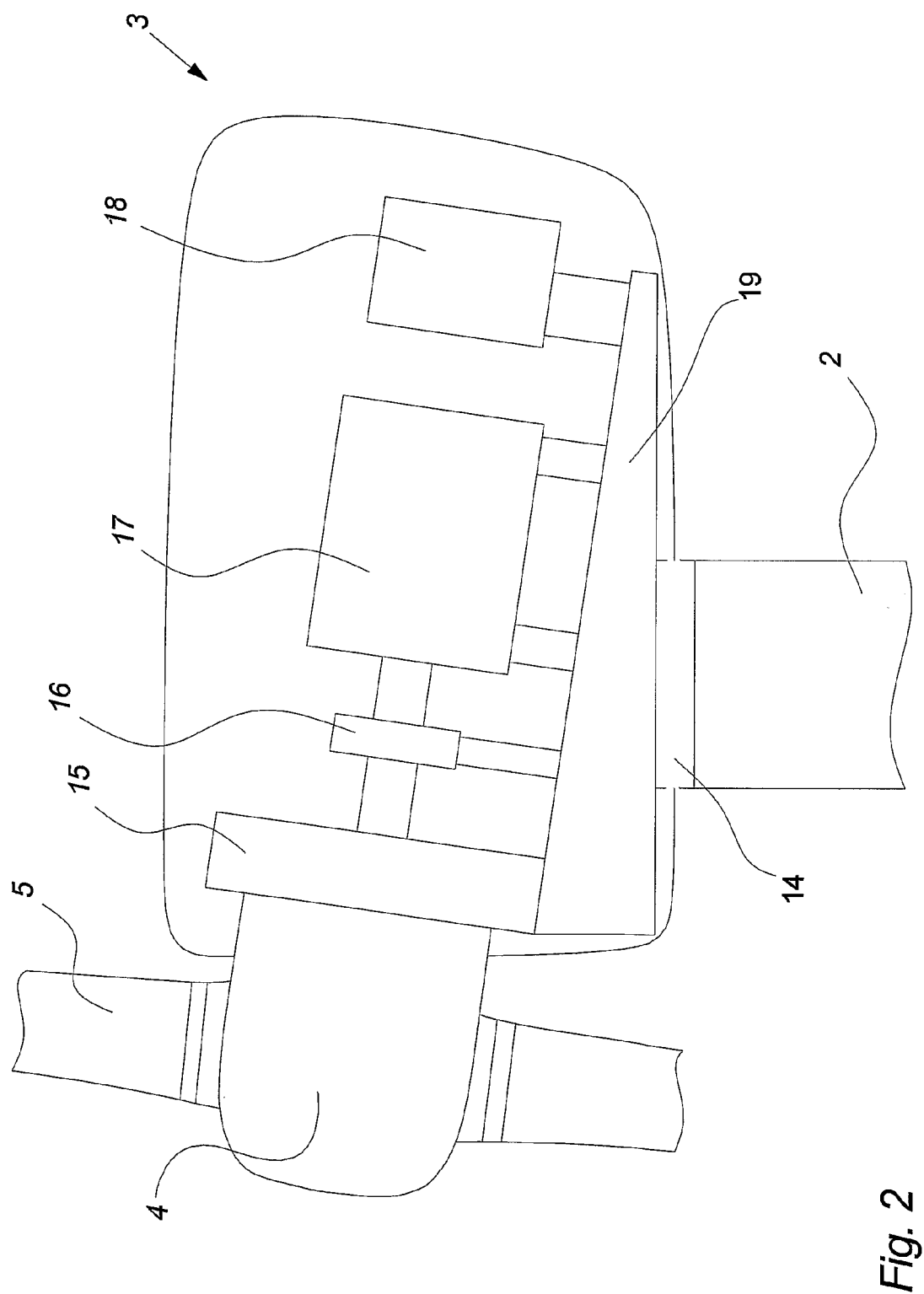
Figure 3:
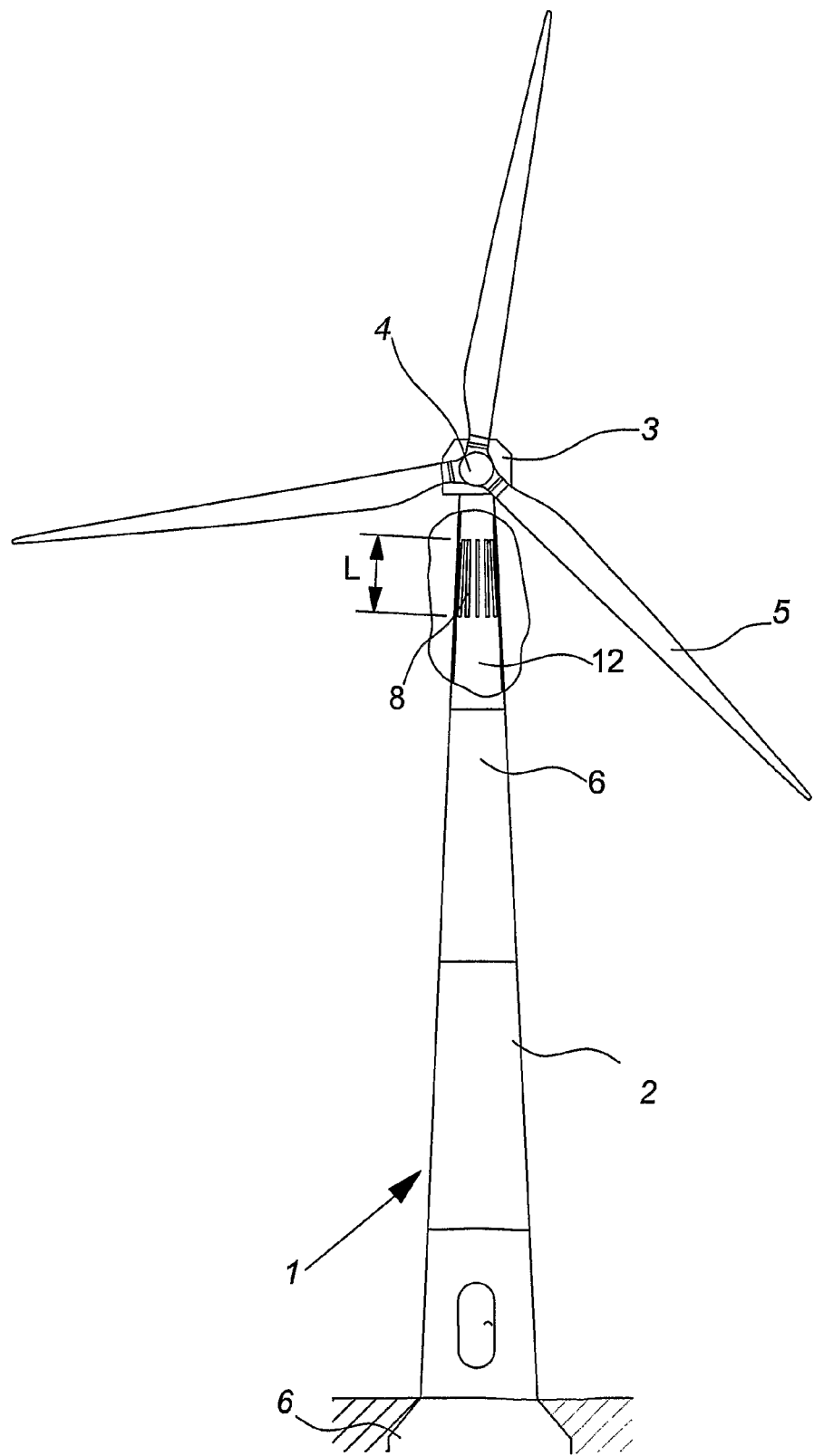
Figure 4A:
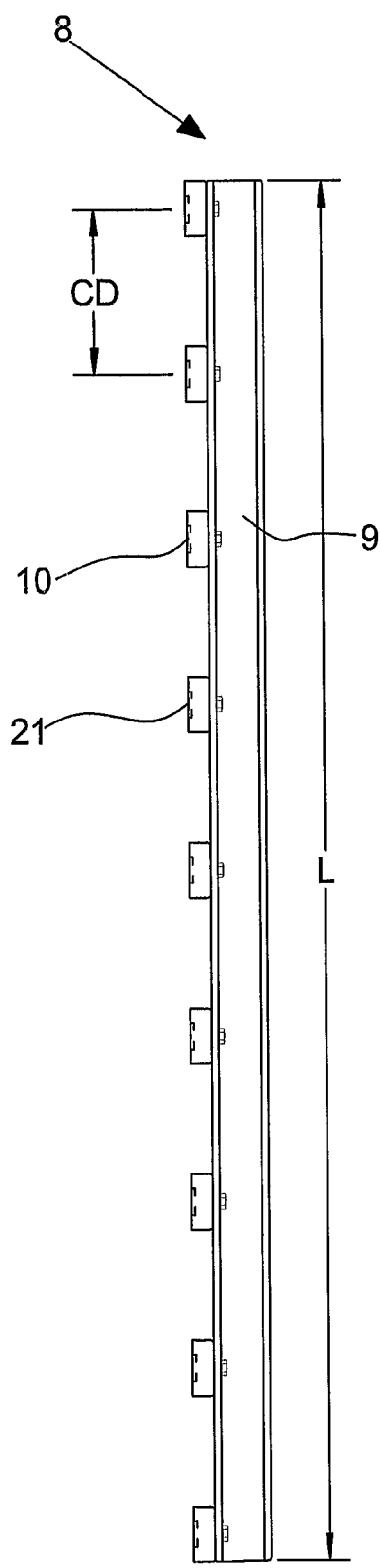
Figure 4B:
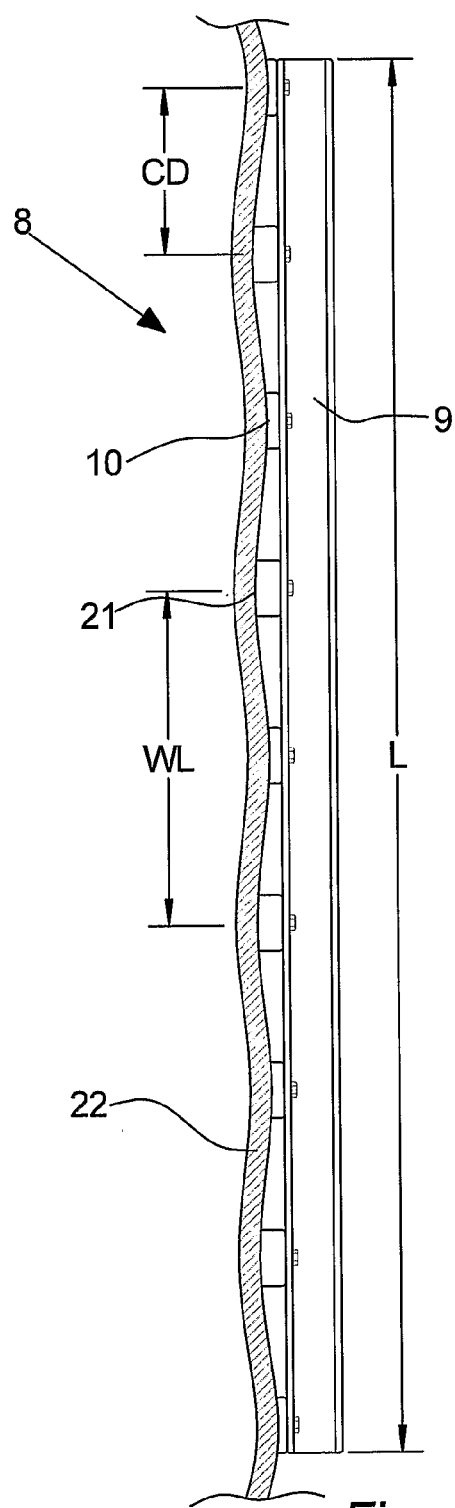
Figure 5:
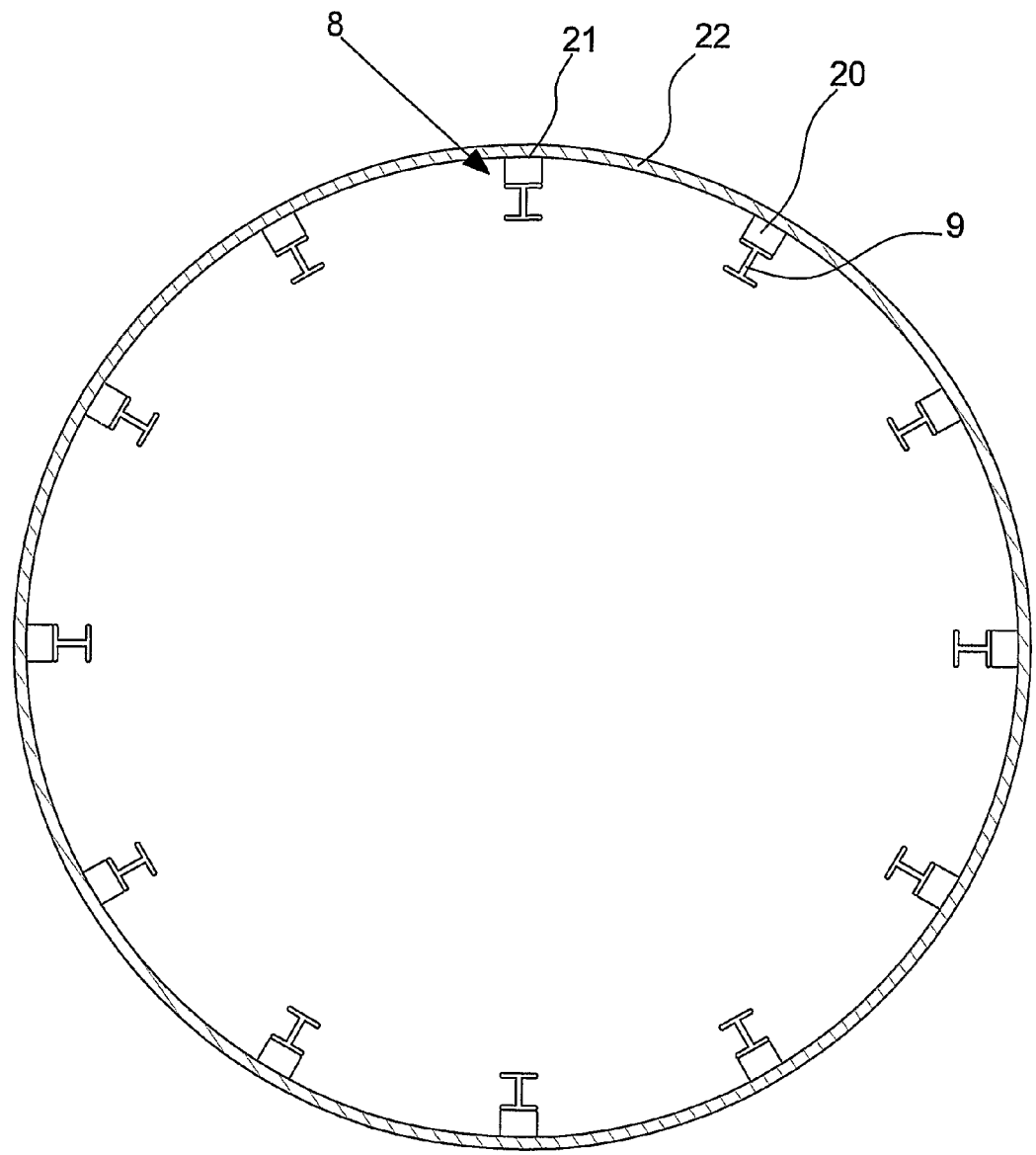
Figure 6:
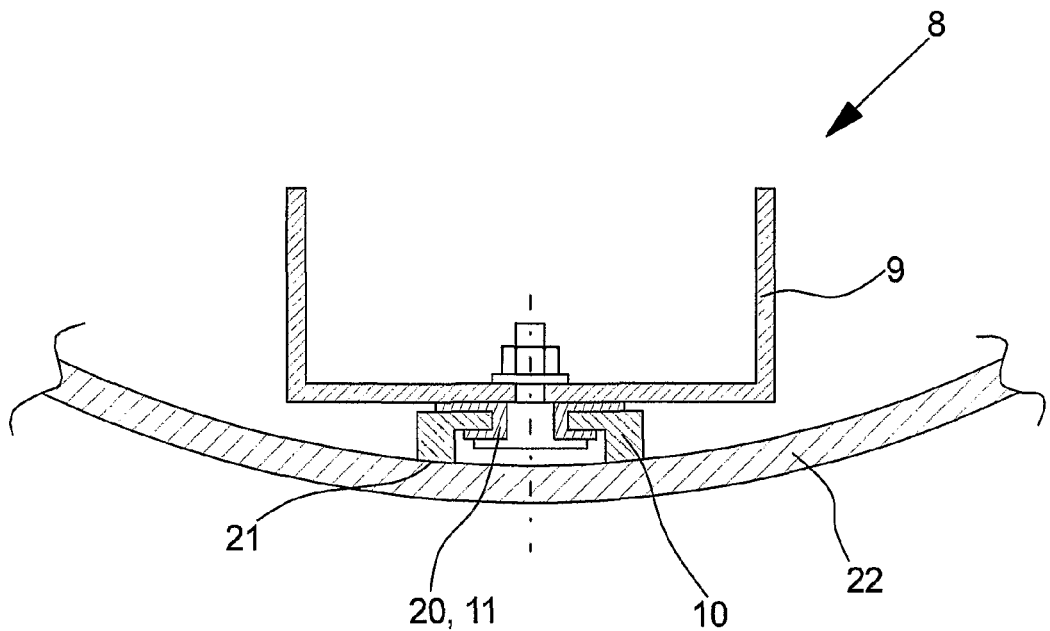
Figure 7:
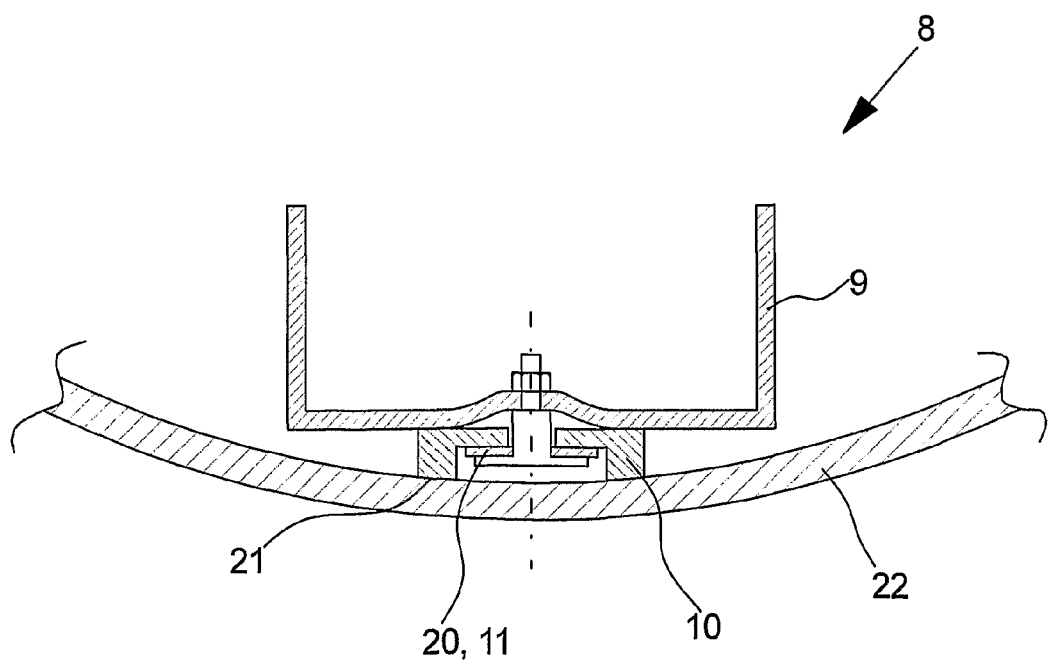
Figure 8:
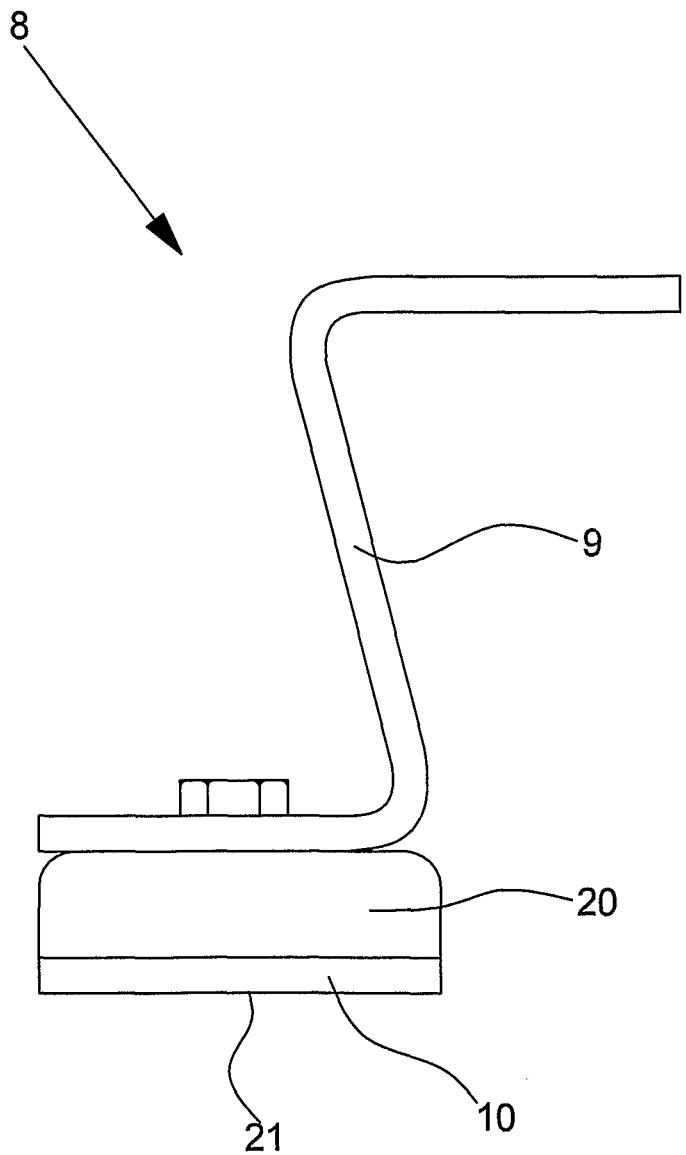
Figure 9:
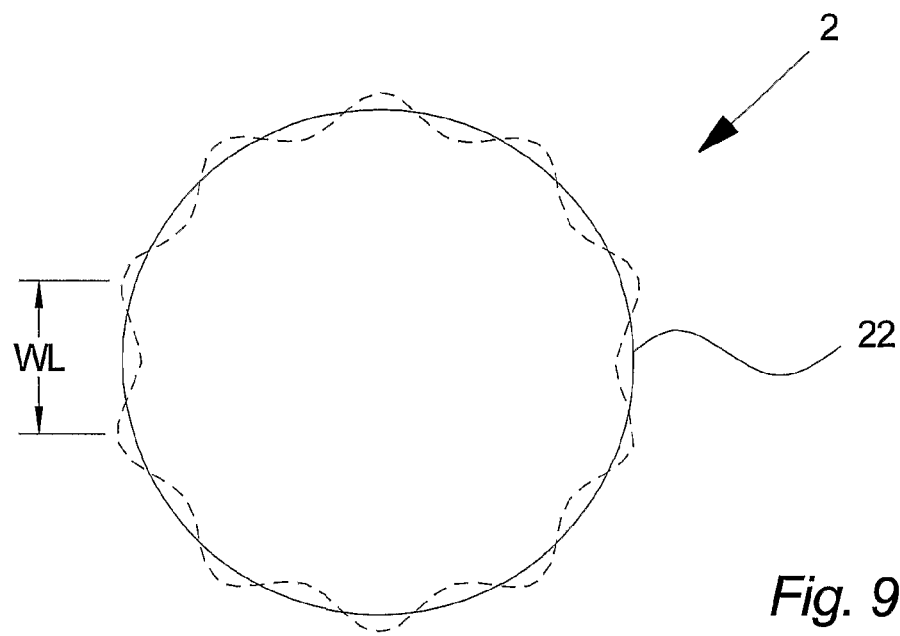
Figure 10:
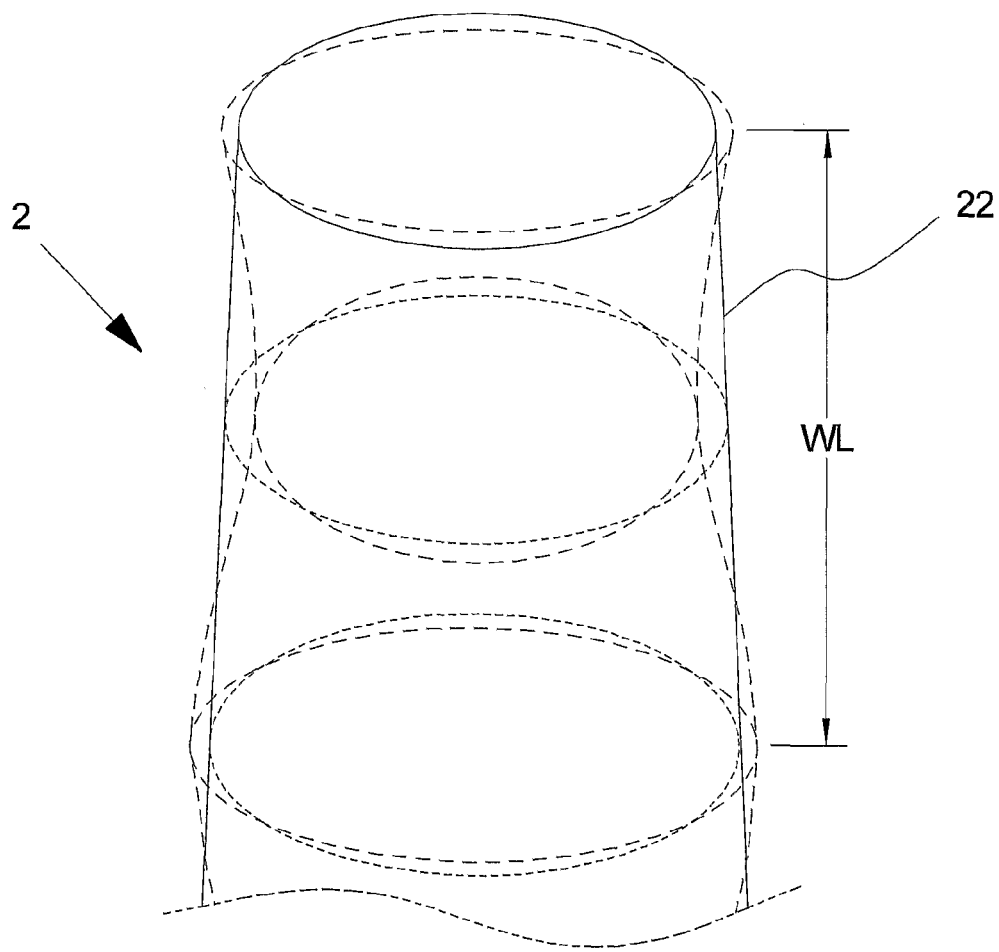

The invention will be described in the following with reference to the figures in which FIG. 1 illustrates a large modern wind turbine known in the art, as seen from the front, FIG. 2 illustrates a simplified cross section of a nacelle, as seen from the side, FIG. 3 illustrates a wind turbine comprising noise reducing means according to the invention, as seen from the front, FIG. 4A illustrates an embodiment of noise reducing means, as seen from the side, FIG. 4B illustrates the embodiment of noise reducing means shown in FIG. 4A mounted on an oscillating tower wall, as seen from the side, FIG. 5 illustrates a cross section of a wind turbine tower comprising evenly spaced noise reducing means, as seen from the top, FIG. 6 illustrates a cross section of noise reducing means comprising magnets and a first embodiment of a flexible coupling, as seen from the top, FIG. 7 illustrates a cross section of noise reducing means comprising magnets and a second embodiment of a flexible coupling, as seen from the top, FIG. 8 illustrates a further embodiment of noise reducing means, as seen from the top, FIG. 9 illustrates waves spreading horizontal in a wind turbine tower, as seen from the top, and FIG. 10 illustrates waves spreading vertically in a wind turbine tower, as seen from in perspective.

DETAILED DESCRIPTION

FIG. 1 illustrates a wind turbine 1 known in the art, comprising a tapered tower 2, which is subdivided into a number of tower sections 6. A wind turbine nacelle 3 is positioned on top of the tower 2.

The wind turbine rotor 4, comprising a number of wind turbine blades 5, is connected to the nacelle 3 through the low speed shaft which extends out of the nacelle 3 front.

Typically a tower section 6 comprise a number of tower rings welded together during the making of the section 6, where each section 6 typically at each end comprises a connection flange for connecting the tower sections 6 to each other at the erection site to form a complete tower 2. The tower sections 6 can theoretically be up to more than 50 or 60 meters long but in practice they are seldom more than 35 meters long to enable that they can be transported on the existing road system.

In this embodiment, the tower 2 comprise a top section 12 on top of five other tower sections 6, but in another embodiment the tower 2 could comprise more or less tower sections 6 such as one, two, three, four or five tower sections 6, for example, depending on the total height of the tower 2, the type of wind turbine 1, the weight of the nacelle 3 and rotor 4, the maximum transportable length or other.

FIG. 2 illustrates a simplified cross section of a nacelle 3 of a prior art wind turbine 1, as seen from the side. Nacelles 3 exists in a multitude of variations and configurations but in most cases the drive train in the nacelle 3 almost always comprise one or more of the following components: a gearbox 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment the load carrying nacelle structure 19 only extends along the bottom of the nacelle 3, for example, in form of a bed frame to which some or all the components 15, 16, 17, 18 are connected. In another embodiment the load carrying structure 19 could comprise a gear bell which through the main bearing, could transfer the load of the rotor 4 to the tower 2, or the load carrying structure 19 could comprise several interconnected parts such as latticework.

At the bottom of the nacelle 3, the wind turbine 1 is provided with a yaw mechanism 14 fitted in the joint between the tower 2 and the nacelle 3. The yaw mechanism 14 could comprise some kind of toothed slewing bearing actuated by some kind of motor driven pinion.

FIG. 3 illustrates a wind turbine 1 comprising noise reducing means 8 according to the invention, as seen from the front In this embodiment of the invention, the tower 2 comprise a number of noise reducing means 8 in the form of rigid beams 9 attached to the inside surface of the tower 2 through a number of vertically displaced damping means 20.

In this embodiment, the beams 9 are made from steel but in another embodiment the beams 9 or some of the beams 9 could be made from another type of metal such as iron, stainless steel, aluminum, titanium or any kind of alloy hereof or the beams 9 could be made from plastic, ceramics or any kind of composite material, for example, reinforced by means of metal rods, wood, wires or fibers.

In this preferred embodiment, the beams 9 are attached to the inside surface of the tower 2 but in another embodiment at least some of the beams 9 could be attached to the outside surface of the tower 2, for example, if it was not possible to fit the beams 9 on the inside surface due to lack of space or if a specific embodiment of the beams 9 was more efficient at reducing noise if attached to the outside surface of the tower 2.

In this embodiment, the noise reducing means 8 are placed on the top section 12 of the tower 2 to prevent vibrations from the nacelle 3 from spreading down through the tower 2 and to reduce the noise emitted from the tower 2, but, for example, if vibration inducing equipment was placed on platforms in or on the tower 2 or at the bottom of the tower 2 it could be advantageous to place the noise reducing means 8 elsewhere in the tower 2.

In this embodiment, the noise reducing means 8 are substantially evenly horizontally spaced around the entire circumference of the tower 2 but in another embodiment of the invention the noise reducing means 8 could be unevenly spaced or they could only be placed at parts of the circumference of the tower 2, for example, to adapt to a very predominant direction of the wind or if noise emission not was a problem at parts of the tower circumference, for example, due to connected equipment such as ladders, elevators, cables and other.

FIG. 4A illustrates an embodiment of a noise reducing means 8, as seen from the side.

In this embodiment of the invention, the beam 9 comprises nine evenly spaced damping means 20 through which the beam 9 is connected to the tower walls 22 by means of magnets 10 embedded in the damping means 20. In another embodiment the beam 9 could comprise another number of damping means 20 but preferably between 2 and 50 and most preferred between 3 and 30. The number of damping means 20 could e.g. be dependent of the frequency or the wavelength of the oscillation in the tower wall 22 inducing the most critical noise.

In this embodiment the damping means 20 comprise connection means 10 in the form of magnets for connecting the noise reducing means 8 rigidly to the tower wall 22 by means of the magnetic attraction forces of the magnets 10. The magnets 10 could be embedded in the damping means 20 to protect the magnets from interacting with the air, with moist or other. In this embodiment the damping means 20 are bolted to a bottom flange of the beam 9 but in another embodiment the damping means 20 could be connected in another way.

In another embodiment the connection means 10 could comprise special fittings for use when connecting to the tower 2 or the damping means 20 could be connected to the tower wall 22 by means of adhesives, bolts, struts, rivets, welding or other or the individual or the different damping means 20 could comprise any combination of mechanical and/or magnetically connection means 10.

In this embodiment the damping means 20 are evenly spaced in the longitudinal direction of the beam 9, in that the centre distance CD between neighboring damping means 20 are uniform throughout the entire length L of the beam 9 making the noise reducing means 8 particularly suited for reducing noise spreading at a specific wavelength WL but in another embodiment the damping means 20 could be spaced differently e.g. with three neighboring damping means 20 positioned at a first given centre distance CD followed by three other neighboring damping means 20 positioned at a second given centre distance CD and, for example, followed by three further neighboring damping means 20 positioned at a third given centre distance CD to make the noise reducing means 8 suited for reducing noise spreading at two, three or more different wavelength WL.

In this embodiment, the noise reducing means 8 are premade with a fixed length L, a fixed number of damping means 20 placed in fixed positions but in another embodiment the noise reducing means 8 could further comprise tuning means 13 in that the damping means 20 could be attached to the beam 9 through elongated slits in the beam 9 to enable that the centre distance CD between two or more of the damping means 20 could be adjusted to make the distance CD substantially fit the distance between a crest and a neighboring trough of the same wave inducing the most critical noise in the tower walls 22.

The noise reducing means 8 could also be provided with tuning means 13 by providing the beam with a multitude of attachments holes enabling that—within a narrow margin—the mutual distance CD between some or all of the damping means 20 can be adjusted to a specific mode of noise or the damping means 20 could be connected to the beam 9 through special fittings enabling that the damping means 20 could slide along the length L of the beam 9 at least during a adjustment procedure for tuning the noise reducing means 8.

If the beam 9 is of a given length L and the tuning of the noise reducing means 8 entails that the centre distance CD between the damping means 20 would have to be increased, the number of damping means 20 could also be adjusted or the beam 9 could be exchanged with at beam 9 of a more suitable length L.

The noise reducing means 8 could be tuned based on already made measurements of the specific noise situation of a specific wind turbine tower 2, for example, measurements of the wavelength WL of the vibrations producing the most critical noise emission from the tower 2 or the noise reducing means 8 could be tuned based on a trial and error method where the centre distance CD between at least some of the damping means 20, the length of the beam 9 and/or the number of connection areas 7 would be adjusted until the best or at least a sufficient noise reduction was achieved.

FIG. 4B illustrates the embodiment of noise reducing means 8 shown in FIG. 4A mounted on an oscillating tower wall 22, as seen from the side.

When the noise reducing means 8 is installed on an oscillating tower wall 22 and the centre distance CD between the damping means 20 is substantially equal to half the wavelength WL of the wave producing the noise the beam 9 will substantially maintain its position in space at all times independent of the magnitude of the oscillations in the tower wall 22. As illustrated substantially half of the damping means 20 will be affected in a first direction while the other half of the damping means 20 is affected in a direction opposite the first direction. This entails that substantially all the energy of the relative motion between the tower wall 22 and the beam is used for deforming the damper means 20 whereby the energy is dissipated via the damper means 20 and the size of the wave is reduced hereby reducing the noise emission.

Furthermore, this embodiment of noise reducing means 8 would also stiffen the tower wall hereby further reducing the noise emission by preventing the wave from spreading through the more rigid tower walls 22.

FIG. 5 illustrates a cross section of a wind turbine tower 2 comprising evenly spaced noise reducing means 8, as seen from the top.

In this embodiment the noise reducing means 8 are evenly spaced around the inside wall 22 of the tower 2 but in another embodiment the noise reducing means 8 could be spaced differently e.g. because of asymmetry in the tower construction entailing that noise emission mainly occurs at a specific side of the tower 2, because of a very dominating wind direction entailing that unwanted vibration would mainly spread from one side, because of limited space inside the tower, for example, due to ladders, elevators, platforms or other or simply because tests had shown that an asymmetrical distribution was needed or sufficient.

Furthermore, in this embodiment the noise reducing means 8 are all of the same length L, same damping means 20 configuration and placed in the same height in the tower 2, but in another embodiment the beams 9 could be of different length L or they could be placed staggered, for example, alternately or some noise reducing means 8 could be provided with damping means 20 distributed at a first mutual distance CD and noise reducing means 8 with damping means 20 distributed at a second mutual distance CD, for example, to increase the efficiency of the noise reducing means 8, to enable noise reduction at different frequencies simultaneously or other.

FIG. 6 illustrates a cross section of noise reducing means 8 comprising magnets 10 and a first embodiment of a flexible coupling 11, as seen from the top.

In this embodiment the connection means 10 are formed as a magnet enabling that the stiffening beam 9 can be connected to the metal tower wall 22 by means of magnetic attraction forces hereby avoiding any welding or holes weakening the tower structure.

For magnetic suspension to be efficient, substantially the entire contact surface 21 have to be in proper contact with the tower wall surface 22 and it can therefore be advantageous to form the damping means 20 as a flexible coupling 11, for example, allowing a small more or less permanent angular, linear or transverse adaption of the contact surface 21 in relation to the tower wall surface 22 to enable good contact.

In this embodiment, the magnets 10 are connected to the beam 9 by means of bolts and the damping means 20 is provided by means of a flexible coupling 11 between said bolt, the beam 9 and the magnet. This damping means 20 could, for example, be made from rubber, plastic, wood or another material more flexible that the magnets, bolts and the tower 2.

FIG. 7 illustrates a cross section of noise reducing means 8 comprising magnets 10 and a second embodiment of a flexible coupling 11, as seen from the top.

In this embodiment of the invention the damping means 20 are formed as a flexible coupling 11 in the form of a flexible washer between the magnet 10 and the head of the bolt.

FIG. 8 illustrates a further embodiment of stiffening beam 9, as seen from the top.

In this embodiment of the invention the beam 9 is Z-shaped but as previously explained, the beam 9 can be H-, I-, S-, C-, L-, M- or U-shaped or the beam 9 can be formed as a closed tube or pipe such as a circular, oval, rectangular or square pipe or the beam 9 could comprise any other closed or open straight, curved or polygonal shape or any combination thereof.

Since it is important that the beam 9 is very rigid, it is also feasible that the beam 9 could comprises some kind of lattice work or other types of reinforcements either in the form of a separate add-on or integrated in the beam 9, for example, if the beam 9 was made through extrusion.

In this embodiment the damping means 20 comprises connection means 10 in the form of simple ferrite based magnets but in another embodiment the magnets could be made from another permanent magnetic material such as Alnico, magnetic Ceramic or preferably Neodymium or Samarium-Cobalt or the magnets could be made from another suitable type of permanent magnetic material or any combination thereof or the magnets could be formed as electro magnets.

FIG. 9 illustrates waves spreading substantially horizontal in a wind turbine tower 2, as seen from the top.

Under certain circumstances oscillations in the tower wall 22 can spread substantially horizontally and circularly in the tower wall 22 as illustrated by the wave in FIG. 9. In this case the noise reducing means 8 could be formed circularly or otherwise to adapt to the specific tower 2 shape and thereby enable the damping means 20 of the noise reducing means 8 could interact with more crests and troughs of the wave simultaneously.

FIG. 10 illustrates waves spreading substantially vertically in a wind turbine tower 2, as seen from in perspective.

When waves in the tower wall 22 spread vertically it is most often because the tower 2 becomes more oval in a first direction and further down the tower 2 becomes more oval in a second direction simultaneously, where the first direction is perpendicular to the second direction. This entails that a vertical cross section of the tower 2 forms a standard sinus shaped wave along at least some of the vertical extent of the tower 2.

The invention has been exemplified above with reference to specific examples of noise reducing means 8, beams 9, damping means 20 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Tower section
7.
8. Noise reducing means
9. Beam
10. Connection means
11. Flexible coupling
12. Top section of tower
13. Tuning means
14. Yaw mechanism
15. Gearbox
16. Braking system
17. Generator
18. Converter
19. Nacelle structure
20. Damping means
21. Contact surface of magnet
22. Tower wall
CD. Centre distance between damping means
L. Length of noise reducing means
WL. Wavelength of noise inducing oscillation of tower wall

The invention claimed is:

1. A wind turbine comprising:
   a wind turbine tower having a tower wall,
   a wind turbine nacelle positioned on top of said tower, and
   a noise reducer for reducing noise emission from said tower, said noise reducer comprising:
      a plurality of discrete circumferentially-spaced beams, each beam being formed as an elongated strengthening member and generally extending in a longitudinal direction of said tower, and a plurality of dampers associated with each beam,
wherein said dampers are arranged relative to the beams to form at least a first set of circumferentially spaced dampers and a second set of circumferentially spaced dampers longitudinally spaced from the first set of dampers, and
wherein said dampers are arranged between said tower wall and said beams so that relative movement between said tower wall and said beams results in dissipation of energy via said dampers in order to reduce noise emission.

2. The wind turbine according to claim 1, wherein said noise is generated by oscillations forming waves in said tower wall and wherein said dampers are connected to said tower wall in positions arranged corresponding to at least two crests and one trough of said wave or to at least two troughs and one crest of said wave.

3. The wind turbine according to claim 1, wherein said noise reducer is connected to a top section of said tower wall.

4. The wind turbine according to claim 1, wherein said noise reducer is connected to the inside of said tower.

5. The wind turbine according to claim 1, wherein said dampers are formed as a flexible coupling between said tower wall and said beam.

6. The wind turbine according to claim 1, wherein said dampers are at least partly made from rubber.

7. The wind turbine according to claim 1, wherein said plurality of dampers comprise one or more magnets for connecting said noise reducer to the tower wall by means of magnetic attraction forces of said magnets.

8. The wind turbine according to claim 1, wherein said noise reducer comprises at least three dampers substantially evenly spaced along the longitudinal length of each of said beams.

9. The wind turbine according to claim 8, wherein said at least three dampers are mutually displaced by approximately half a wavelength of a noise inducing oscillation in said tower wall.

10. The wind turbine according to claim 1, wherein each of said beams has a length which is at least 1.5 times the wavelength of noise inducing oscillations in said tower.

11. The wind turbine according to claim 1, wherein each of the beams has a length of between 0.5 and 30 meters.

12. The wind turbine according to claim 1, wherein each of said beams is orientated substantially vertically on said tower.

13. The wind turbine according to claim 1, wherein each beam is in non-contact relation with another beam.

14. The wind turbine according to claim 1, wherein each beam has a length extending in a longitudinal direction of the tower, and a width extending in a direction transverse to the longitudinal direction of the tower, the width of the beams being less than a cross dimension of the tower along the section of the tower for which the beam extends.

15. The wind turbine according to claim 1, wherein the plurality of beams are symmetrically arranged along the circumference of the tower.

16. A method for reducing noise emission from a wind turbine tower by providing a noise emitting tower wall with a noise reducer so that noise inducing oscillations in the tower wall result in dissipation of energy via dampers arranged between the tower wall and an elongate beam of the noise reducer, the noise reducer comprising a plurality of discrete circumferentially-spaced beams, each beam being formed as an elongated strengthening member and generally extending in a longitudinal direction of the tower, and a plurality of dampers associated with each beam, wherein the dampers are arranged relative to the beams to form at least a first set of circumferentially spaced dampers and a second set of circumferentially spaced dampers longitudinally spaced from the first set of dampers.

17. The method according to claim 16, further comprising establishing the wavelength of one or more of the noise inducing oscillations in the tower wall before the noise reducer is provided to the noise emitting tower wall.

18. The method according to claim 17, wherein the noise reducer is tuned by adjusting distances between the dampers connected to the same beam in accordance with the wavelength of the noise inducing oscillations.

19. A wind turbine comprising:
a wind turbine tower having a tower wall,
a wind turbine nacelle positioned on top of said tower, and
a noise reducer for reducing noise emission from said tower comprising a beam formed as an elongated strengthening member and one or more dampers,
wherein said dampers are arranged between said tower wall and said beam so that relative movement between said tower wall and said beam results in dissipation of energy via said dampers in order to reduce noise emission, and wherein said noise reducer comprises a tuner for adjusting a centre distance between at least two of said dampers in accordance to a wavelength of noise inducing oscillations in said tower wall.

20. A method for reducing noise emission from a wind turbine tower by providing a noise emitting tower wall with a noise reducer so that noise inducing oscillations in the tower wall result in dissipation of energy via dampers arranged between the tower wall and an elongate beam of the noise reducer, and tuning the noise reducer by adjusting the centre distance of the dampers in accordance with the wavelength of the noise inducing oscillations.

* * * * *